Nov. 29, 1966     L. CORRSIN     3,288,604
IMAGING METHOD USING AN ELEMENT HAVING A GLASS OVERCOATING
Filed Sept. 3, 1964
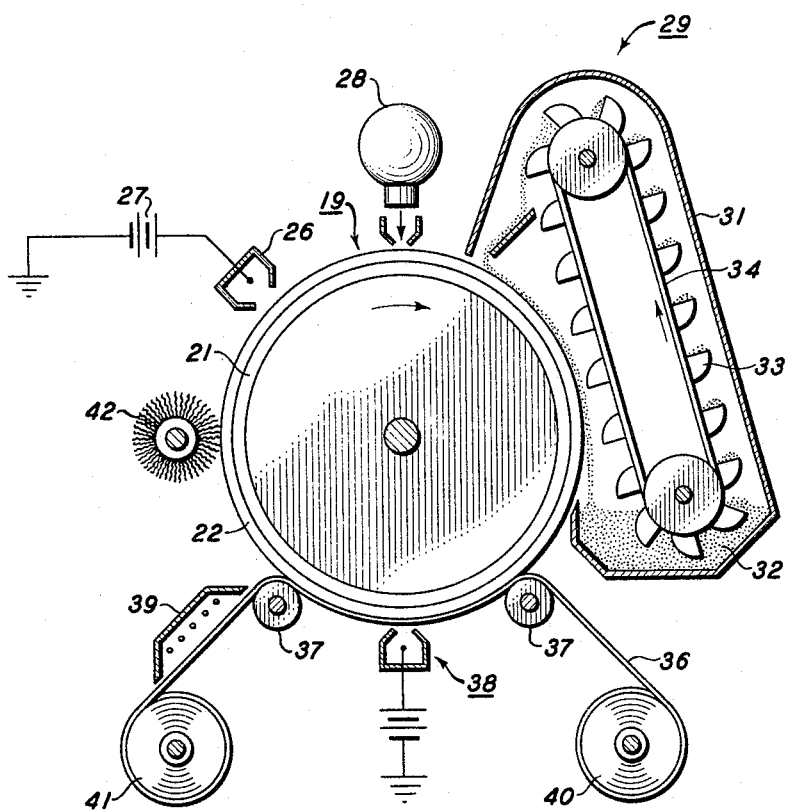
INVENTOR.
LESTER CORRSIN
BY
ATTORNEYS

United States Patent Office 3,288,604
Patented Nov. 29, 1966

3,288,604
IMAGING METHOD USING AN ELEMENT
HAVING A GLASS OVERCOATING
Lester Corrsin, Penfield, N.Y., assignor to Xerox Corporation, Rochester, N.Y., a corporation of New York
Filed Sept. 3, 1964, Ser. No. 394,228
5 Claims. (Cl. 96—1)

This application is a continuation-in-part of Ser. No. 184,594, filed Apr. 2, 1962, and now U.S. Patent No. 3,151,982.

This invention relates to electrophotography and more specificially to a novel electrophotographic apparatus.

In the xerographic process as described in U.S. 2,297,691 to C. F. Carlson, a base plate of relatively low electrical resistance such as metal, paper, etc., having a photoconductive insulating surface coated thereon, is electrostatically charged in the dark. The charged coating is then exposed to a light image. The charges leak off rapidly to the base plate in proportion to the intensity of light to which any given area is exposed being substantially retained in non-exposed areas. After such exposure, the coating is contacted with electrostatic marking particles in the dark. These particles adhere to the areas where the electrostatic charges remain, forming a powder image corresponding to the electrostatic image. The powder image can then be transferred to a sheet of transfer material, resulting in a positive or negative print, as the case may be, having excellent detail and quality. Alternatively, where the base plate is relatively inexpensive, as of paper, it may be desirable to fix the powder image directly to the plate itself.

As discussed in Carlson, photoconductive insulating coatings comprise anthracene, sulfur or various mixtures of these materials, such as sulfur with selenium, etc., to thereby form uniform amorphous coating on the base material. These materials have a sensitivity largely limited to the shorter wave lengths and have a further limitation of being only slightly light-sensitive. Consequently, there has been an urgent need for improved photoconductive insulating materials.

The discovery of the photoconductive insulating properties of highly purified vitreous selenium has resulted in this material becoming the standard in commercial zerography. The photographic speed of this material is many times that of the prior art photoconductive insulating materials. However, vitreous selenium suffers from two serious defects: (1) its spectral response is very largely limited to the blue or near ultraviolet; and (2) the preparation of uniform films of vitreous selenium has required highly involved and critical processes, particularly processes involving the preparation of extremely clean and uniform substrates and vacuum evaporation techniques. This, together with the high cost of selenium itself has led, by commercial necessity, to the use of selenium xerographic plates in repetitive processing cycles, that is, it required that the selenium plate be re-used many times in the xerographic process, so that the cost per copy of such a plate may be a reasonably small figure. Under conditions of optimum use, a vitreous selenium plate can be used to prepare 100,000 or even more copies before it deteriorates to the point of unsatisfactory image formation. Under other conditions, far fewer copies can be made.

The deterioration observed in selenium plates follows from the mechanical abrasion attendant to the developing process and the cleaning step wherein a rapidly rotating fur brush contacts the selenium surface to remove from the surface any developer particles adhering thereto after the transfer step. In addition to mechanical abrasion, the heat to which the plate is subjected both by virtue of the friction involved in the various processing steps and, of more importance, by the propinquity of heat fusing devices generally located (by engineering necessity) in close proximity to the xerographic drum in commercial machines.

In U.S. 2,663,636, Arthur Middleton discloses various methods and means whereby any photoconductive insulating material in an insulating resin binder can be formed into an operable xerographic plate. This discovery greatly simplified the procedures for the preparation of zerographic plates and in particular eliminated the necessity for vacuum evaporation processes and for careful cleaning of the substrate.

Following this, Dr. Middleton, together with Mr. Reynolds, found that a xerographic plate can be prepared by intimately mixing together a photoconductive material with a high resistance binder, the photoconductive material containing a metallic ion-containing inorganic crystalline compound having electrons in the non-conductive energy level activatable by illumination to a different energy level whereby an electric charge is free to migrate under an applied electric field.

This invention is disclosed in detail in U.S. Patent 3,121,006 which was copending with the parent of this application. An essential element of this invention was the recognition that photoconductive materials could be employed having substantially lower resistivities than heretofore required. Thus, whereas prior to the work of Middleton and Reynolds, it was understood that a xerographic coating must comprise a "photoconductive insulator," meaning a material which itself could support an electrostatic charge in the dark and disperse the charge upon exposure to light, these workers recognized for the first time that these were necessary properties only of the composite layer of pigment and binder, and that the individual pigment materials utilized in such structures must be photoconductive as previously described, but may possess a much wider range of resistivity than had been previously recognized and still be operable in a xerographic binder plate. In particular, materials having too low a resistivity to support an electrostatic charge in the dark when applied as a homogeneous layer to a conductive backing can be admixed with an electrically insulating binder and still function in the xerographic process.

The use of a binder did not extend the limits of the xerographic process to the point where all photoconductive, semiconductors and similar materials could be utilized in the preparation of xerographic binder plates, i.e., it was still essential that the finely-divided photoconductive material incorporated in the binder have a resistivity in the range normally associated with insulators but no longer limited to the extremes of resistivity as had previously been the case. Further, by the use of metallic ion-containing compounds, Middleton and Reynolds taught that such materials by reason of their ability to vary both overall sensitivity and spectral response as by adding additional ions to the lattice (i.e., doping) or by creating deficient states therein, so that the electronic structure is modified, permitted one to alter the photoconductive properties of the compound. Thus, the flexibility of preparation discovered by Middleton, Middleton and Reynolds contributed a vastly wider range of materials than heretofore and further taught that the preferred subclass of these materials could be modified so as to obtain virtually any desired spectral response and/or speed in the resulting xerographic plate.

These plates, i.e., the binder plates of Middleton and Reynolds, in general, possessed physical properties inferior to vitreous selenium plates, i.e., those pigments or photoconductive materials possessing optimum photographic speed and spectral response were equally expensive as vitreous selenium, while the resulting resin-pigment layers generally lacked the physical hardness for use under long processing cycles under the conditions existing in commercial xerographic machines as above described.

For several years now there have been known or available electroluminescent cells, photocells, and other devices of similar structure comprising a phosphor or photoconductive material embedded in a glass binder and having a conductive electrode on each surface thereof, so that a current may be passed through the glass-phosphor combination. Such devices are described for example in U.S. 2,930,999 to J. G. Van Santen et al.; U.S. 2,993,001 to Schonebarger; U.S. 2,689,188 to Hushley and U.S. 2,937,353 to Wasserman. These devices, requiring an ohmic contact with conductive electrodes on each side of the layer, are antithetical to the properties of a xerographic plate which requires a blocking contact on one surface and a free surface on the other for the formation and utilization of a stable electrostatic image and which further requires resistivities many orders of magnitude higher than are tolerable in a photocell and the ability to accept a substantial charge by corona deposition. Accordingly, such layers have not heretofore been suitable for use in xerography.

It is therefore an object of this invention to provide an electrophotographic apparatus devoid of the above noted disadvantages.

It is another object of this invention to provide an electrophotographic apparatus comprising a photoconductive element having desirable utility in reusable electrophotographic systems.

Still another object of this invention is to provide an electrophotographic apparatus having desirable physical properties.

Yet another object of this invention is to provide an electrophotographic system containing a xerographic plate having a photoconductive layer comprising a relatively inexpensive hard photoconductive material.

The above and still further objects, features and advantages of the present invention will become apparent upon consideration of the following detailed disclosure of the invention, especially when taken in conjunction with the accompanying drawings wherein:

FIGURE 1 is a side view of a typical apparatus embodying the concept of the invention.

The foregoing objects and others accomplished in accordance with this invention are provided by an electrophotographic apparatus comprising in combination an electrophotographic plate and a charging means. The electrophotographic plate comprises a photoconductive layer including an inorganic glass binder and finely divided inorganic photoconductive particles. The plate is adapted to retain a charge and selectively dissipate a charge when exposed to activating radiation. The charging means is positioned contiguous to said photoconductive layer and is adapted to deposit the charge on said plate. "Contiguous," for the purposes of this invention, will be defined as in Webster's New Collegiate Dictionary, second edition, 1956: in actual contact; touching; also, near, though not in contact; adjoining. In a preferred embodiment of this invention, the electrophotographic apparatus comprises an electrophotographic plate which may be a conductive substrate having thereon a photoconductive layer comprising inorganic photoconductive particles dispersed in a glass binder. The photoconductive layer has thereon a glass overcoating which contains less inorganic photoconductive particles than in said photoconductive layer.

In FIGURE 1 there is illustrated an automatic continuous type xerographic copier utilizing in a typical illustrative application a cylindrical xerographic plate and charging device of the type which is described more fully hereinafter. The cylindrical xerographic plate 19 is made up of a base or supporting substrate 21 and a binder layer 22 of photoconductive particles dispersed in glass, both of said layers being more fully described hereinafter. On the outer side of the cylindrical plate or drum and spaced slightly therefrom is a charging unit 26 connected to a source of high potential 27. The charging unit 26 contains one or more wire filaments connected to the potential source and operates on the corona discharge technique as described in U.S. Patents 2,588,699 to Carlson and 2,777,957 to Walkup. Essentially, this technique consists of the spacing of a filament slightly from the surface of the xerographic plate having a grounded base and applying a high potential to the filament so that a corona discharge occurs between the filament and the plate thus serving to deposit charge on the plate surface to raise its level of electrostatic potential with respect to ground potential. It is to be understood, of course, that this charging mechanism is only exemplary in nature and other charging means may also be employed.

The xerographic plate or drum, when in operation, is rotated at a uniform velocity in the direction indicated by the arrow in the figure so that after portions of the drum periphery pass the charging unit 26 and have been uniformly charged, they come beneath the projector 28 or other means for exposing the charged plate to the image to be copied. Subsequent to charging and exposure, sections of the drum surface move past the developing unit generally designated 29. This developing unit is of the cascade type which includes an outer container or cover 31 with a trough at its bottom containing a supply of developing material 32. This developing material is picked up from the bottom of container 31 and dumped or cascaded over the drum surface by a number of buckets 33 on an endless driven conveyor belt 34. This development technique, which is more fully described in U.S. Patent 2,618,552 to Wise and 2,618,551 to Walkup utilizes a two-element developing mixture including finely divided colored marking particles of toner and grossly larger carrier beads. The carrier beads serve both to deagglomerate the toner and to charge it by virtue of the relative positions of the toner and carrier material in the triboelectric series. When the carrier beads with toner particles clinging to them are cascaded over the drum surface, the electrostatic field from the charge pattern on the drum pulls toner particles off the carrier bead, serving to develop the image. The carrier beads, along with any toner particles, not used to develop the image, then fall back into the bottom container 31 and the developed image moves around until it comes in contact with the copy web 36 which is pressed up against the drum surface by two idle rollers 37 so that the web moves at the same speed as the periphery of the drum. A transfer unit 38 is placed beneath the web and spaced slightly from it between rollers 37. This unit is similar in nature to the plate charging mechanism 26, 27 and also operates on the corona discharge principle. The transfer device is also connected to a source of high potential of the same polarity as that employed in the charging device so that it deposits charge on the back of web 36 which is of the same polarity as the charge on the drum and opposite polarity to the toner particles utilized in developing the drum. This charge on the back of the web 36 pulls the toner particles away from the drum by overcoming the force of attraction between the particles and the charge on the drum. It should be noted at this point that many other transfer techniques may be utilized in connection with the invention. After transfer of the toner image to web 36, the web moves beneath a fixing unit 39 which serves to fuse or permanently fix the toner image to web 36. In this case, a resistance heating type fixer is illustrated, however, other techniques known in the xerographic art may also be utilized including the subjection of the toner image to a solvent vapor, or the like. After fixing, the web is rewound on a coil 41 similar to the coil 40 from which it originally comes, while the drum continues its rotation, moving beneath a cleaning brush 42 which prepares it for a new cycle of operation.

It has now been found that xerographic plates having a structure similar to the above noted binder plates of Middleton and Middleton and Reynolds, may be prepared from the photoconductive materials known to those skilled in the art by mixing such finely divided photoconductive insulating materials with a glass enamel and fusing the enamel to a conductive backing to form a uniform layer of the photoconductive particles embedded in the glass binder.

The base or backing material used in preparing xerographic binder plates according to the invention provides physical support for a photoconductive insulating layer and also acts as an electrical ground, thereby permitting the photoconductive layer to receive an electrostatic charge in the dark and permitting the charges to migrate when exposed to light. It is evident that a wide variety of materials may be used, for example, metal surfaces such as aluminum, brass, stainless steel, copper, nickel, zinc, etc., conductively coated glass as tin or indium oxide-coated glass, aluminum-coated glass, etc.; under certain conditions, as at higher temperatures, common plate glass has a sufficiently low resistivity to act as a ground plane. In general, to act as a ground plane as described herein, a backing material may have a surprisingly high resistivity such as $10^6$ or $10^8$ ohms-cm. The material must, however, be capable of withstanding the temperatures required for fusing the glass enamel.

The photoconductive materials useful in the instant invention are any of those materials disclosed in the prior art as useful in xerographic binder plates. A thorough discussion of these materials is given in U.S. Patent 3,121,006, and is incorporated herein. In general, as there stated, a material is considered a photoconductor suitable for use in a binder plate if it shows a resistivity in the dark above about $10^9$ ohms-cm. and a lower resistivity when exposed to light. Generally, photoconductive materials are described as being characterized by having electrons in the non-conductive energy level (valence band) activatable by illumination to a different energy level (conduction band), whereby an electric charge is free to migrate under an applied electric field in the order of at least $10^3$ volts per cm. In general, the composite resistivity of the photoconductive material in the binder in the case of the instant invention should be at least about $10^{12}$ ohms-cm. in absence of illumination. The materials which have been found useful in xerographic binder plates include without limitation calcium-strontium sulfide, zinc sulfide, zinc oxide, zinc selenide, cadmium sulfide, cadmium selenide, mercuric sulfide, antimony sulfide, arsenic sulfide, lead monoxide, gallium selenide, indium sulfide, arsenic selenide, mercuric oxide, titanium dioxide, zinc titanate, zinc-magnesium oxide, zinc silicate, red lead, etc.

A particularly preferred class of photoconductive compounds are those metallic ion-containing inorganic compounds termed phosphors. By the term "phosphors" as used herein is meant not only those metallic ion-containing inorganic compounds which inherently or by virtue of particular methods of preparation, doping, etc., display photoluminescence when exposed to low energy photons, that is visible light or ultraviolet light, but any substance capable of luminescence. Luminescence is not, per se, desirable in this invention but is frequently associated with photoconductivity. Particularly preferred materials are appropriately doped chalcogenides of zinc and cadmium and, even more particularly, the sulfides and selenides of these metals either as mixed sulfides and selenides of zinc and/or cadmium, as a mixed zinc and cadmium sulfide or selenide or as simple compounds.

Suitable photoconductive materials are available from various sources. They are often sold specifically as pigments, photoconductors, or phosphors. A suitable zinc oxide material, for example, is available from the New Jersey Zinc Company as Florence Green Seal No. 8. Suitable activated cadmium sulfide photoconductor materials are available from Radio Corporation of America as F–2103 and F–2111. A suitable "luminescent" grade cadmium sulfide is also available from the General Electric Company as Type 118–8–2 and from Sylvania Electric Products. These materials are generally doped with an activator such as copper or silver and a co-activator such as chlorine in order to achieve maximum photosensitivity. If suitably doped materials are not available, they may be prepared by diffusing the activators into the basic materials under high temperature vacuum conditions or in a high temperature and pressure hydrothermal process. Further information on doping procedures may be found in U.S. Patent 2,876,202 and in the RCA Review for March 1959.

Cadmium sulfoselenides are useful materials in the present invention and may be purchased or prepared. A bright red orange pigment F–14854 and a maroon pigment F–14857 from the Ferro Corporation are very suitable. They are known cadmium oxide colors in the enamelling trade, but are actually cadmium sulfo-selenides. They also include substantial amounts of a glassy phase including $Al_2O_3$ and $SiO_2$. These additional constituents appear to be beneficial rather than detrimental since they increase the compatibility of the pigment with glass binder materials. Cadmium sulfoselenides may also be prepared by reacting elemental selenium with cadmium sulphide or by reacting sulphur and selenium with $CdCO_3$. In a preferred method a mixture of about 4 parts cadmium sulfide to 1 part selenium is sealed in a glass container having a small vent opening and is heated to about 480° C. Another preferred method is to sinter a mixture of finely divided CdS and CdSe in the presence of a small percentage of cadmium chloride as a flux.

A great variety of known glass-forming mixtures may be used as the binder material. In general, there are three types of oxides used in making frits: acidic, basic and neutral or amphoteric. The acidic oxides, mainly $SiO_2$ and $P_2O_5$, are network forming and raise viscosity and melting point when in excess. Less acidic or neutral oxides such as $B_2O_3$, $Sb_2O_3$ and $As_2O_3$, do not raise viscosity and melting point; in fact, $B_2O_3$ actually lowers viscosity. The basic oxides such as $Na_2O$, $CaO$, $K_2O$, $MgO$, $BaO$, $PbO$, $ZnO$ and $CdO$ are network stoppers and they lower viscosity and melting point by making the glass network of oxygen bridges less extensive. Fluoride is a unique acidic constituent with its viscosity lowering property. Silica, the least soluble glass, also has the highest viscosity or softening point. As basic oxides are added to it, melt viscosity is lowered.

The main criteria of a desirable frit for embedding photoconductors to make a xerographic plate are low fusing temperature needed to produce fusing and inertness in forming poisoning by-products by reaction with the photoconductor. The oxides contributing most to low fusing temperature are $B_2O_3$ and PbO, sodium oxide and potassium oxide. Fluorides also lower melting temperature but also cause silica and boric oxide volatility when used in excess. Calcium oxide, and especially zinc oxide and cadmium oxide lower the softening point to a certain degree up to a certain extent. Antimony and arsenic oxides lower the melting point also. A typical frit may include from about 50 to 70 mol percent of combined $B_2O_3$ and $SiO_2$ and the rest basic oxides. Those metals which form black sulfides tend to poison some photoconductors. In the case of lead oxide, however, and also iron, nickel and similar ions, this poisoning effect may be overcome for a sulfide photoconductor by the addition of cadmium oxide or other materials which prevent the gross formation of lead sulfide from the cadmium sulfide and lead oxide or borate by reversing the equilibrium.

Other metallic oxides conventionally used in glass formulations and in particular those known as useful in matrix glass formulations such as lithium oxide, aluminium oxide, titanium dioxide, etc., may be present at least in small amounts. While the glasses are generally considered in terms of oxides, it is understood that low melting glass-forming sulfides such as arsenic sulfide, antimony sulfide, etc., may also be used.

Typical compositions of frits useful as the binder in preparing the glass binder plates of the instant invention have the following composition ranges (all figures are mol percentages:)

TABLE I

| | | |
|---|---|---|
| $B_2O_3$ | 0–50 | |
| $SiO_2$ | 0–50 | |
| CaO | | 40–75 combined. |
| ZnO | | |
| CdO | | 10–35 combined. |
| PbO | | |
| $Na_2O$ | | |
| $K_2O$ | | 0–20 combined. |
| $Li_2O$ | | |
| NaF | | 0–10. |
| $Al_2O_3$ | | 0–5. |
| $Sb_2O_3$ | | 0–10. |
| $As_2O_3$ | | 0–3. |

This is not a hard and fast range of compositions, as is obvious to those skilled in the art. Thus Schonebarger, above, discloses a glass binder which is operable to make xerographic plates but is outside the ranges set forth above. However, the ranges set forth are an accurate guide in formulating operable glass binders.

For example, a typical composition within this range, useful in the instant invention, has the following composition:

TABLE II

| | Percent by weight |
|---|---|
| Boric acid | 20 |
| GaO | 13 |
| ZnO | 21 |
| Dehydrated borax ($Na_2B_4O_4$) | 28 |
| Sodium ortho-silicate ($Na_2SiO_2$) | 18 |

An unusual property observed in the instant invention is that solder glass, which consists almost entirely of lead borate, is useful in formulating operable xerographic binder plates. Despite the known deleterious effect of lead when used without a stabilizing agent, such solder glasses may be used when they are heated sufficiently to bond the photoconductive pigment by fusion of the glass binder.

Commercially available frits useful in the preparations of xerographic binder plates include Corning No. 110–2, a thermosetting solder glass; Corning 1970 and 1971 E.L., the latter two being electroluminescent phosphor embedding glasses, all available from the Corning Glass Company, Du Pont J–232 and N–845, both of these materials being porcelain enamel frits for use on aluminum; Harshaw fluxes AG 850, 862 and 881, all of these materials being enameling glasses for use on glass substrates and available from the Harshaw Chemical Company; and A1–8, a glass enamel intended for use on an aluminum base and available from the Ferro Corporation. This material is furnished in a red pigmented form and is also available in a clear unpigmented form. This is a proprietary material, but it was analyzed spectroscopically and chemically, as shown in Table III below. The spectrographic analysis was done without benefit of standards so that much more confidence should be placed in the chemical analysis. Care should be taken not to overfire the J–232 material, as it will become less resistive and unable to retain a corona charge. If the glass will not retain a charge, it is not operable to make a xerographic plate.

TABLE III

| Oxide | Spectroscopic Analysis | Chemical Analysis |
|---|---|---|
| $SiO_2$ | Major | 28.60 |
| $Al_2O_3$ | .10 | |
| PbO | 5.0 | 3.12 |
| ZnO | 2.5 | .56 |
| CdO | .50 | 7.05 |
| $TeO_2$ | .01 | |
| $P_2O_5$ | 1.0 | 3.28 |
| $Fe_2O_3$ | .04 | |
| $TiO_2$ | 10.0 | 1.55 |
| $Sb_2O_3$ | .5 | |
| $Cr_2O_3$ | .001 | |
| $B_2O_3$ | 2.0 | 6.32 |
| $Na_2O$ | 15.0 | 21.85 |
| $K_2O$ | 2.0 | 19.90 |
| $Li_2O$ | 5.0 | 5.40 |
| MgO | .001 | |
| MnO | .001 | |
| $SnO_2$ | .5 | |
| $Bi_2O_3$ | .003 | |
| MoO | .002 | |
| $V_2O_5$ | .001 | |
| CmO | .001 | |
| $ZrO_2$ | .01 | |
| SrO | .2 | |
| CaO | .1 | |
| $CO_3$ | 2.8 | |

Particularly where the photoconductive insulating layer is rather thick, it is desirable that the heat expansion coefficients of the support and the layer be roughly comparable. This condition is usually met by using commercial frits on the type of base material for which they are intended. It is understood that commercial frits for use with aluminum have their coefficients of expansion most nearly matched to the 6000 series of aluminum alloys, particularly 6061–S.

The relative proportions of binder and photoconductor are critically important in determining the operability of the structure in the xerographic process. In general, the photoconductor should comprise no more than about 60% by weight, of the total composition, and preferably from about 6 to about 20%. This is in marked contrast to the electroluminescent cells and photo-cells of the prior art which are virtually inoperative at these higher binder to pigment ratios. It is believed that the higher binder-pigment ratio is the critical factor in establishing a blocking contact between the photoconductive particles and the electrically conductive backing plate which is believed to be essential for the operation of a xerographic plate of this type, while a low-binder photoconductor ratio apparently promotes a too close contact among particles, and between particles and backing and establishes an ohmic or injecting contact. Regardless of theory, it has been found that the above proportions must be adhered to in order to produce a functioning xerographic plate capable of relatively retaining or dissipating a surface charge.

The thickness of the photoconductive insulating layers of the instant invention is not critical and may vary from about 10 microns to about 200 microns. It is preferred that the layers be from about 20 to about 150 microns thick. These photoconductive insulating layers of the invention are characterized by outstanding wear-resistance properties.

At the lower binder-pigment ratios found operable for xerographic plates, the surface of the plate may have a matte appearance. Accordingly, it may be desirable in achieving a glossy surface, to overcoat the surface of the plate either with a layer of clear glass binder or with a layer of glass binder having a small amount of photoconductive particles therein, i.e., a substantially smaller amount of the photoconductor than in the main photoconductive insulating layer, to thus achieve a glossy surface. Alternatively, a glossy surface may be achieved by contacting the free surface of the photoconductive layer with a very smooth surface while the photoconductive insulating layer is still in a plastic or even molten condition. In this instance, it is important to select a smooth surface which is not adhesive to the photoconductive insulating layer, so that there can be no adverse adhesion therebetween which would complicate separation of the surfaces after the photoconductive insulating layer has been adequately smoothed.

The means of application of the photoconductor-binder combinations of the invention are well known and are not critical in the instant invention. The glass binder may be used as received, or, if not sufficiently finely ground, may be subjected to further processing as by ball-milling to produce a smaller particle size of the glass particles. In general, the glass particles or frit should be no more than about 4 microns in diameter. However, the size of the particles may vary, depending on the viscosity of the resultant glass melt; the lower the viscosity, the larger the particle size which may be tolerated while still achieving a uniform layer. Similarly, the photoconductive insulators themselves should be in a suitable finely divided state. While photoconductive particle sizes as large as about 50 microns may be used, it is preferred that particle size be as small as possible; in general, particle sizes of no more than about 20 microns are used, and preferably the photoconductive particles should have an average particle size of no more than about 1 micron.

The finely divided photoconductive particles and glass binder particles are desirably dispersed in a liquid, as distilled water, or an organic liquid, as alcohol, ethyl acetate, ethylene glycol, etc. and a uniform dispersion obtained by mixing the liquid. In accordance with conventional enamelling practice, the photoconductive and glass particles may be ground together in water using small amounts of sodium silicate, sodium hydroxide and boric acid as dispersing agents. The resulting slurry may then be applied to the desired surface by air spraying, dipping, painting, or other coating operation as is standard in the art. Care must be taken that air bubbles or other discontinuities are eliminated from the slurry prior to coating. The coating is dried to remove most of the liquid. Then, before cracking occurs, the plate is fired at the necessary temperature to fuse the glass binder and produce a uniform homogeneous layer of photoconductive pigment dispersed in a vitreous glass binder. The support layer should be clean before the coating material is applied thereto. Any conventional cleaning technique will suffice. Aluminum layers may simply be heated to the firing temperature and cooled before the coating material is applied. However, the various known chemical treatments used in the enamelling art may also be used, if desired, as may the controlled oxidizing treatment given conventional aluminum based xerographic plates before selenium is applied thereto.

The following examples will further define the specifics of the present invention. The examples given below indicate various preferred embodiments of the present invention. These examples are illustrative only and are not intended to be limiting in any manner. The charging means used in the examples are corona charging devices; however, similar results are obtained by using any other conventionally known charging means. All parts and percentages are by weight unless otherwise specified.

EXAMPLE I

Using distilled water, an aqueous slurry was prepared, containing 25% of a substantially non-luminescent zinc oxide pigment (obtained from New Jersey Zinc Company under the designation of Florence Green Seal No. 8) and 75% of a Du Pont mixed oxide frit designated J–232. The slurry was sprayed on an aluminum surface with an air brush, using $CO_2$ as the propellant. As soon as the water dried out, but before cracking began, the plate was fired at about 1000° F. for about 5 minutes. The plate was slowly cooled to room temperature and was then tested in the xerographic process. It was found that the plate accepted an electrostatic charge in the dark and discharged the electrostatic charge upon exposure to light, thus demonstrating that the plate was operable in xerography.

EXAMPLES II–III

In these examples an RCA F–2103 cadmium sulfide was mixed with Corning 110–2 solder glass and water to form a slurry and spread with a doctor blade on tin oxide coated soft glass to give a film thickness of 5 mils. The films were then fired for about 2 minutes at 450° C. Example II contained 20% CdS by weight and Example III contained 40%. Example II was about twice as fast as a comparison vitreous selenium plate and Example III was about five times as fast. Xerographic prints were made from each of these examples.

EXAMPLES IV–XIV

In these examples the plates were prepared by first preparing a slurry of the designated enamel and photoconductive pigment in distilled water and then spraying the mixture on the designated backing material with an air brush, using $CO_2$ as the propellant. After spraying on the enamel and drying, but before cracking began, plates were slowly moved into the firing oven, and maintained at the correct temperature, in this case 1000° F. except for the AG–881 binder, which is fired at 1200° F. The plates were held at this temperature for six minutes and then slowly cooled to room temperature and tested as shown in Table IV.

TABLE IV

| Example No. | Substrate | Photo-conductor Type | Photo-conductor, percent | Binder | Thickness (Microns) | Volts | Sensitivity, percent |
|---|---|---|---|---|---|---|---|
| IV | Glass-SnO | F–14854 | 30 | AG–881 | 80 | −590 | 50 |
| V | Aluminum-3003-S | F–14854 | 5 | Al–8 | 110 | +220 | 4 |
| VI | do | F–14854 | 10 | Al–8 | 70 | +670 / −670 | 3.4 / 8 |
| VII | do | F–14854 | 15 | Al–8 | 100 | +620 / −1,020 | 18 / 21 |
| VIII | do | F–14854 | 32 | Al–8 | 90 | +490 / −490 | 12 / 42 |
| IX | do | F–14857 | 5 | Al–8 | 90 | +550 / −570 | 3 / 0.6 |
| X | do | F–14857 | 10 | Al–8 | 100 | +950 / −970 | 7 / 13 |
| XI | do | F–14857 | 15 | Al–8 | 90 | +490 / −190 | 25 / 72 |
| XII | do | F–14857 | 30 | Al–8 | 90 | +10 / −15 | -- |
| XIII | do | F–2111 | 20 | Al–8 | 110 | +390 / −330 | 1.3 / 3 |
| XIV | do | F–2111 | 30 | Al–8 | 110 | +170 / −260 | 3 / 4 |

For purposes of comparison a selenium plate tested under similar conditions has a sensitivity of between 20 and 30%. Sensitivity is measured as the percentage of charge lost after exposure for 1/10 second to a specified quantity of illumination. $V_o$ is the initial potential accepted from a corona charging device. The corona charging current was somewhat lower for Examples VII–XII than for other examples. Pigment concentrations of over 15% gave rough surface, poorly suited for xerography, with poor adhesion. The cadmium sulfide pigment showed poor adhesion with the A1–8 binder. Better results with this pigment were had with the AG–881 binder, as shown in a later example.

As already noted the Ferro Corporation A1–8 aluminum enamel is also available in a red form. X-ray diffraction analysis of this material showed that it contains about 4–6% cadmium sulfoselenide. Accordingly, plates were made from this material in accordance with the plate making procedure already described except that no additional pigment was added to the red binder material. These plates proved to be photocon-

TABLE V

| Example No. | Photoconductor Type | Photoconductor, percent | Binder | Thickness, Microns | Volts | Sensitivity, percent |
|---|---|---|---|---|---|---|
| XV | F–14854 | 15 | A1–8 | 120 | +300 / −965 | 29 / 48 |
| XVI | F–14854 | 25 | A1–8 | 110 | +620 / −730 | 14 / 68 |
| XVII | F–14854 | 15 | AG–881 | 40 | +830 / −1,180 | 6 / 25 |

EXAMPLES XVIII–XXI

These plates were prepared as in Examples II–IX. In each case tin oxide coated glass was used for the substrate and the Harshaw AG–881 for the glass binder. The pigment in each of these plates was a commercial cadmium sulfide photoconductor obtained from RCA and designated F–2111. The photoconductive layer on these plates had a thickness of about 4 mils (100 microns) each. Plates so prepared were tested as described in Examples II–IX. They were fired to 1200° F. A commercial selenium plate was used as a control.

TABLE VI

| Example No. | Photoconductor, percent | Volts | $D_{30}$, percent | Sensitivity, percent | Residual (Volts) |
|---|---|---|---|---|---|
| XVIII | 40 | +250 / −490 | 60 / 19 | 4 / 72 | 3 / 10 |
| XIX | 50 | +165 / −50 | 66 / 50 | 54 / 90 | 0 / 0 |
| XX | 60 | −180 | 10 | 70 | 0 |
| XXI | 20 | −1,075 | 3 | 20 | 510 |
| Control (Se) | | +405 | 2.5 | 23 | 0 |

All of the particles in these examples were quite uniform in appearance. The plates in Examples XIII–XV had a matte surface, making them less satisfactory for xerography while the plate of Example XVI had a smooth, glassy surface and perhaps for that reason a relatively high residual. $D_{30}$ is the percentage of charge lost after 30 seconds in darkness.

EXAMPLES XXII–XXIII

In these examples Example XX was duplicated, excepting that in Example XXII one half of the plate surface was overcoated by applying a slurry of the pure AG–881 enamel to the plate and firing it to produce a 1 micron overcoat, while in Example XXIII the overcoating on one half of the plate consisted of 20% of the F–2111 in AG–881, fired to give a 1 micron overcoating. The plates were then tested as in the above examples, the measurements being taken on both the non-overcoated and the overcoated portions of the plates. The results are set forth in Table VII.

TABLE VII

| Example No. | Volts | $D_{30}$, percent | Sensitivity, percent | Residual (Volts) |
|---|---|---|---|---|
| XXII (Non-overcoated) | −180 | 10 | 70 | 0 |
| XXII (Overcoated) | −850 | 10 | 71 | −470 |
| XXIII (Non-overcoated) | −155 | 80 | 94 | 0 |
| XXIII (Overcoated) | +680 | 15 | 35 | −225 | ductive and exhibited electrical properties comparable to those in which a photoconductive pigment was separately added to a photoconductive frit. These plates also made xerographic prints of unusually high quality.

On testing a glass enamel binder plate in the xerographic process under repetitive cycling conditions wherein the plate is sequentially charged and then flooded with a 4 watt blue fluorescent lamp, no significant increase of residual voltage or of dark decay rate was observed. After over 700 cycles, the dark decay value increased only from about 15% to about 20% and after almost 1400 cycles there was no further increase observed.

Xerographic plates made according to the present invention often exhibit poor electrical properties when newly made but light sensitivity and dark decay characteristics generally improve markedly during the first 24 hours after manufacture. It has also been observed at times that plates which exhibit good electrical properties nevertheless produce xerographic images of poor quality with low resolution or even no image at all. The image-forming qualities of these plates can often be greatly improved by polishing their surfaces, as by buffing with rouge. A simpler and generally more effective treatment involves applying water to the surface of the plate. This may be done by immersing the plate in ordinary tap water for about 15 minutes and then thoroughly drying under an infrared lamp. This generally produces a marked improvement in the ability of the plate to produce a xerographic print. Distilled water as well as certain other materials classified as Lewis bases also have a beneficial effect but none appears to be more effective than ordinary tap water. Acids, on the other hand, are to be avoided because they not only impair the ability of the plate to form a xerographic image but may even damage the plate to the extent that it will not accept an electrical charge or will retain only a negligible charge.

A glass enamel plate was also compared to a commercial selenium plate in an abrasion tester. In this unit a vitreous enamel plate and a selenium plate were placed inside a revolving drum loaded with silica sand. After more than one quarter of a million cycles in the cylinder, the plates were removed and examined. About 7 microns of selenium had been abraded away from the selenium plate, while no detectable loss in thickness could be seen in the enamel plate, the only obvious change being a slight reduction in gloss. Thus the vitreous enamel xerographic plates have an operating life between 25 to 250 times greater than the selenium plates. Further, on using a glass enamel binder plate at a temperature of 50° C., no deleterious effect on the xerographic process is observed.

When the surface of a glass enamel plate is abraded to the point where it becomes dull, the xerographic properties of the plate are impaired. These properties can be restored to those of a new plate by refiring the plate under substantially the same conditions as used when the plate was first made. This entails bringing the plate up to about the glass softening point temperature. This largely restores the gloss to the plate and also largely restores its xerographic properties.

For example, a xerographic plate was fabricated from 14 parts by weight of a cadmium sulfoselenide photoconductor in 100 parts by weight of a glass making frit composed of 65 parts by weight PbO, 18 parts by weight $SiO_2$, 8.1 parts by weight $B_2O_3$ and 7.8 parts by weight CdO. This mixture was coated on a conductive substrate, fired at about 625° C. and endurance tested in an Xerox 914 Office Copier. After thousands of copies had been produced, a gradual degradation in print quality became apparent and eventually reached a point where large sections of the print were either not reproduced or became illegible. At this point the plate was removed from the Copier and refired by again heating to the glass softening point. After cooling and replacement in the Copier, the plate produced more than twice as many prints as it had originally before the onset of print degradation. The prints produced by the refired plate were at least equal in quality to those produced by the plate immediately after initial production. When print degradation did finally set in once again, a second refiring was carried out under the same conditions resulting in another doubling of the number of good quality prints produced to about 27,000 copies prior to degradation. The third refiring produced an additional 27,000 good quality copies. Both this plate and a large number of additional test plates responded in about the same way showing great improvement and rejuvenation even after a fourth refiring.

Plates according to the present invention are very durable and have other advantageous properties based on the superior physical properties of these plates. These may also have superior electrical properties. In particular, the techniques of the present invention enable economical production of xerographic plates incorporating certain cadmium chalcogenides. These photoconductors can be used in other structures and other photoconductors can be used in the present invention but these photoconductors appear to be unusually compatible with glass binder plate structures. When used in such structures, they result in a plate with an unusual spectrosensitivity which extends into the red region of the spectrum whereas most practical xerographic plates whether of the vitreous or binder type have been sensitive primarily in the ultraviolet and blue or blue-green regions of the spectrum. This broadened spectral response is particularly characteristic of plates incorporating cadmium sulfoselenides and these plates are substantially photoconductive all the way out to approximately ten thousand angstroms.

Other photoconductive pigments and glass binder compositions than those specified in the above examples may be used in lieu of or together with those of the examples with similar results. Also, other charging and exposure means known in the prior art may be substituted for those given in the examples with like results. Other modifications will occur to those skilled in the art upon a reading of this disclosure; these are intended to be encompassed within the present invention.

What is claimed is:
1. An imaging method comprising:
   (a) providing an electrophotographic plate comprising a photoconductive layer including an inorganic glass binder and finely divided inorganic photoconductive particles overlaying a conductive substrate, said photoconductive layer comprising less than about 60 percent by weight of said photoconductive particles and having a glass overcoating overlaying said photoconductive layer, said glass overcoating containing less inorganic photoconductive particles than in said photoconductive layer;
   (b) forming an electrostatic latent image on said plate; and
   (c) developing said latent image, whereby a visible image is formed.
2. The method of claim 1 wherein the photoconductive layer has a thickness up to about 200 microns.
3. The method of claim 1 wherein the photoconductive particles are selected from the group consisting of at least one chalcogenide of at least one material selected from the group consisting of zinc and cadmium.
4. The method of claim 1 wherein the photoconductive particles are cadmium sulfoselenide.
5. The method of claim 1 wherein the photoconductive particles are cadmium sulfide.

References Cited by the Examiner

UNITED STATES PATENTS

| | | | |
|---|---|---|---|
| 2,930,999 | 3/1960 | Van Santen et al. | 338—15 |
| 3,041,167 | 6/1962 | Blakney et al. | 96—1 |
| 3,070,900 | 1/1963 | Lot | 96—1 |
| 3,151,982 | 10/1964 | Corrsin | 96—1 |

NORMAN G. TORCHIN, *Primary Examiner.*

C. E. VAN HORN, *Assistant Examiner.*